United States Patent Office 2,889,236
Patented June 2, 1959

2,889,236
LATEX BASE EXTERIOR PROTECTIVE COATING COMPOSITIONS

Frank J. Hahn, Springfield, Mass., assignor to Monsanto Chemical Company, St. Louis, Mo., a corporation of Delaware No Drawing. Application July 17, 1956
Serial No. 598,253

5 Claims. (Cl. 117—72)

This invention relates to aqueous latices of certain quadricomponent interpolymers. More particularly, the invention relates to modifications of said latices.

The quadricomponent interpolymers of this invention are interpolymers of (1) a monovinylidene aromatic hydrocarbon, (2) an unsaturated monocarboxylic acid, (3) an unsaturated nitrile, and (4) a restricted class of acrylic or methacrylic esters. The process for preparation of the quadricomponent interpolymers and the latices resulting from the process are disclosed and claimed in U.S. Serial No. 467,654, filed November 8, 1954, now U.S. Patent 2,767,153, in the name of Ernest Alexander Sutton.

The latices of the quadricomponent interpolymers may be compounded with various fillers, pigments, etc., to provide excellent exterior paints but the one drawback of these paints is that they exhibit poor durability when directly applied over new wood, over severely weathered surfaces, or over surfaces coated with a severely chalked paint without first applying a primer or cleaning the surfaces by sandblasting. As a result, the painter must maintain a supply of two quite different paints, or be prepared to carry out an expensive sandblasting operation.

One object of this invention is to modify aqueous latices of quadricomponent interpolymers.

A further object is to provide an aqueous latex paint which may be used as an undercoat or primer coat for exterior surfaces.

These and other objects are attained by adding a drying or semi-drying oil containing a conventional drying catalyst to an aqueous latex paint formulated from certain quadricomponent interpolymers as hereinafter described.

The following examples are given in illustration of the paints of this invention. Where parts are mentioned, they are parts by weight.

EXAMPLE I

A 50% solids interpolymer latex is prepared for use in the subsequent examples. The interpolymer prepared consists of 40% 2-ethylhexyl acrylate, 52% styrene, 6% acrylonitrile, and 2% methacrylic acid. The following solutions are prepared.

| | Parts |
|---|---|
| Monomer premix "A": | |
| Acrylonitrile | 6 |
| Styrene | 14 |
| Monomer premix "B": | |
| Styrene | 38 |
| 2-ethylhexyl acrylate | 40 |
| Methacrylic acid | 2 |
| Catalyst premix: | |
| Potassium persulfate | 0.5 |
| 30% solids isopropanol solution of an alkyl aryl polyether sulfate | 1.0 |
| Water | 25 |
| Reaction vessel charge: | |
| Alkylaryl polyether alcohol | 0.2 |
| Water | 75 |

The reaction vessel charge listed above is charged to a glass-lined reaction vessel fitted with a reflux condenser and an agitator. The reaction mixture is brought to reflux temperature and the catalyst premix is added thereto at a constant rate over an 80-minute period. The monomer premix "A" is added to the refluxing reaction vessel charge over a 30-minute period and then monomer premix "B" is added over the next 50-minute period. The reaction mixture is maintained under reflux until the temperature peaks, at which time the polymerization is substantially complete. The resultant latex is cooled to room temperature and the pH thereof is adjusted to 8–9 with 28% ammonium hydroxide. The latex obtained contains 50% solids, is grain and lump-free, and has an average particle size of about 0.2 to 0.3 micron.

EXAMPLE II

Several pigmented latex base protective coating compositions are prepared from the latex described in Example I above. Two control protective coating compositions are prepared in which the latex solids constitute the sole film-former and pigment-binder in the composition. Five protective coating compositions of this invention are prepared in which there is added to one of the control protective coating compositions raw linseed oil or a bodied linseed oil. These coating compositions are prepared by dispersing the desired amount of pigment in water with the aid of a dispersing agent, mixing the dispersion thus formed with the latex and then adding the oil to the latex with sufficient agitation to emulsify the oil. The make up of the coating composition thus prepared is set forth in Table I.

*Table I*

| Composition* | Control I | A | B | C | Control II | D | E |
|---|---|---|---|---|---|---|---|
| Pigment | [1] 60 | [1] 60 | [1] 60 | [1] 60 | [2] 40 | [2] 40 | [2] 40 |
| Water (added) | 40 | 40 | 40 | 40 | 10 | 10 | 10 |
| Methyl Cellulose | 0.4 | 0.4 | 0.4 | 0.4 | 0.4 | 0.4 | 0.4 |
| Tetrapotassium Pyrophosphate | 0.4 | 0.4 | 0.4 | 0.4 | 0.4 | 0.4 | 0.4 |
| Latex (50% solids) | 40 | 40 | 40 | 40 | 40 | 40 | 40 |
| Raw Linseed Oil | | 4 | 16 | 24 | | | |
| Heat Bodied Linseed Oil | | | | | | 4 | 12 |
| $\frac{\text{Oil}}{\text{Interpolymer}} \times 100$ percent | | 20 | 80 | 120 | | 20 | 60 |

*All figures are parts by weight.
[1] 15 pts. rutile TiO$_2$, 10 pts. anatase TiO$_2$, 5 pts. china clay and 30 pts. talc.
[2] 17 pts. rutile TiO$_2$, 7 pts. brown iron oxide, 6 pts. china clay and 10 pts. talc.

EXAMPLE III

Compositions A, B, C, and control I of Table I are evaluated. Unpainted panels of edge grain cedar siding are given an undercoat of compositions A, B, C, and control I and each panel is then given a topcoat of control I. The panels are subjected to outdoor ageing for one year at Springfield, Massachusetts, with the panels facing south and being placed at a 45 degree angle from the horizontal. Within eight months the panels which are undercoated with control I show evidence of cracking along the grain line. The panels which are undercoated with compositions A, B, and C do not show evidence of cracking within the one-year test period.

EXAMPLE IV

Example III is repeated except that the compositions are applied to concrete surfaces, some of which are untreated and some of which exhibit severe chalking derived from a previous treatment with a conventional paint. The surfaces undercoated with control I exhibit severe flaking within a test period of about two years regardless of the condition of the surface before the application of the undercoat. The surfaces undercoated with compositions A, B, and C exhibit no flaking in the same weathering test.

EXAMPLE V

In this example, compositions D, E, and control II in Table I are evaluated. Panels of unpainted edge grain cedar siding are coated with, respectively, compositions D, E, and control II and then given a topcoat of control II. The panels are subjected to a one-year weathering period as described in Example III. The panels that are undercoated with control II crack in about eight months along the grain lines of the wood. At the end of the one-year period, none of the panels undercoated with compositions D and E shows any such cracking.

EXAMPLE VI

Example V is repeated except that the test panels employed are previously painted cedar panels which have been weathered and have a heavily chalked surface. Comparable results are obtained in that the panels that are undercoated with control II show flaking within a three-year period, whereas the panels undercoated with compositions D and E do not.

The compositions of this invention are pigmented coating compositions in which the vehicle and pigment binder consist essentially of a synthetic resin latex having emulsified therein drying oil or semi-drying oil in an amount equal to at least 20 parts by weight based on 100 parts of the synthetic resin solids of the latex.

The quadricomponent interpolymer latices are interpolymers of (1) a monovinylidene aromatic compound, (2) a restricted class of alkyl esters of acrylic or methacrylic acid (sometimes hereinafter referred to as the unsaturated ester), (3) acrylic acid or a monophenyl or monomethyl-substituted derivative thereof (sometimes hereinafter referred to as the unsaturated carboxylic acid), and (4) acrylonitrile or methacrylonitrile (sometimes hereinafter referred to as the unsaturated nitrile).

The unsaturated ester component of the interpolymer should constitute 35–60% and preferably 35–45% of the interpolymer; the unsaturated nitrile should comprise about 3–10% and preferably 4–8% of the interpolymer; the unsaturated monocarboxylic acid should comprise 2–5% of the interpolymer with the balance of the interpolymer, i.e., 60–25% and preferably 60–40% of the interpolymer constituting monovinylidene hydrocarbon, all percentages being on a weight basis.

The monovinylidene aromatic hydrocarbon included in the interpolymer may be styrene, alpha-methylstyrene, p-chlorostyrene, 2,4-dichlorostyrene, 2,5-dichlorostyrene, p-methylstyrene, alpha-methyl-p-methylstyrene, m-ethylstyrene, p-isopropylstyrene, vinyl naphthalene, etc., or mixtures of two or more such vinylidene aromatic hydrocarbons.

The unsaturated esters included in the interpolymers are straight-chain or branch-chain aliphatic alcohol esters of acrylic or methacrylic acid. The alcohol radicals included in the esters should be saturated and should contain from 5–20 carbon atoms with the additional provision that the longest continuous chain in the alcohol radical should contain from 5–14 carbon atoms. Typical of the esters that may be employed are the acrylic and methacrylic acid esters of amyl alcohol, hexanol, 2-ethylhexanol, 2-methylpentanol, the oxo alcohol of an isobutylene dimer, heptyl alcohol, 3-methylethyl alcohol, the oxo alcohol of an isobutylene trimer, the oxo alcohol of a propylene dimer, octyl alcohol, dodecyl alcohol, tridecyl alcohol, tetradecyl alcohol, etc.

Typical of the unsaturated carboxylic acids that may be included in the interpolymer are acrylic acid, methacrylic acid, cinnamic acid, atropic acid, crotonic acid, and mixtures of two or more of such unsaturated monocarboxylic acids.

The latexes employed in the present invention are prepared by a special aqueous emulsion polymerization technique. In this procedure, all of the unsaturated nitrile monomer is admixed with from one-and-one-half to three times its weight of monovinylidene aromatic hydrocarbon, the mixture is added to water containing an emulsifying agent and polymerization initiator, and the mixture is then polymerized at from 30–150° C. with constant agitation to form a particulate copolymer dispersed in water. When the unsaturated nitrile and monovinylidene aromatic hydrocarbon have been substantially completely (i.e., 90–95% conversion) polymerized, the balance of the monomers is added and polymerization is continued under similar conditions until the reaction is complete.

The oil to be added to the previously described quadricomponent interpolymer latex may be any unsaturated film-forming oil such as the natural drying oils, synthetic drying oils, heat bodied or blown drying oils, and semi-drying oils, e.g., linseed oil, dehydrated castor oil, soybean oil, tung oil, fish oils, cottonseed oils, blown linseed oil, etc., or mixtures thereof. The amount of oil may vary between 20 and 200 parts per 100 parts of interpolymer. The oil should contain a catalytic amount of the conventional oil driers such as the various metal resinates.

The oils can be readily emulsified in the synthetic resin latex through the use of conventional nonionic and anionic surfactants as the alkylaryl sulfonates, the alkyl sulfates, etc. In general, sufficient emulsifying agent will be included in the preparation of the quadricomponent interpolymer latex to emulsify up to 100 weight percent of oil based on the quadricomponent interpolymer solids of the latex.

The pigments, driers, viscosity modifiers, etc., that are included in the pigmented protective coating compositions of this invention may be varied widely and are those conventionally employed in the art. The compositions of this invention are readily prepared by conventional techniques. Preferably, a latex base protective coating composition is prepared from the quadricomponent interpolymer latex by conventional techniques and the oil is then incorporated therein with gentle stirring. If desired, the oil can be omitted from the formulation and stirred into the latex base composition at the site at which the composition is to be employed.

The latices of this invention are adapted for application to porous surfaces to provide an undercoat which is unaffected by defects in the treated surface such as extreme weathering, excessive chalking, or lack of primer and which undercoat serves as an efficient and lasting anchor for top coats. The latices are particularly effective where the top or finish coat is to be an unmodified pigment quadricomponent interpolymer. The nature of the surface which may be treated is immaterial as long as it is porous. Thus the latices may be applied successfully to wood in the form of clapboards, shingles and other shapes and designs, to asbestos surfaces such as shingles, boards, etc., to masonry surfaces such a concrete, brick, cinder blocks, stucco, field stone, etc., to cork insulation, etc.

The latices of this invention may be applied to the porous surfaces by conventional methods such as brushing, spraying, roll-coating, etc., to provide a continuous film having a thickness of from 0.5 to 5 mils. The films dry quickly to present a firm, chemically resistant coating which is substantially unaffected by water.

The above descriptions and examples are set forth by way of illustration only. Many other variations and modifications thereof will be obvious to those skilled in the art and can be made without departing from the spirit and scope of the invention herein described.

What is claimed is:

1. An aqueous latex paint suitable for application to exterior surfaces as an undercoat comprising a pigmented aqueous latex containing 100 parts of a quadricomponent interpolymer and homogeneously admixed therewith from 20 to 200 parts of a member of the group consisting of drying oils, semi-drying oils, and mixtures thereof, said oils containing a drying catalyst, said quadricomponent interpolymer containing from (1) 35–60 parts of an unsaturated ester of the group consisting of straight-chain and branched-chain saturated aliphatic alcohol esters of acrylic and methacrylic acid containing a total of about 5–20 carbons in the alcohol radical of which about 5–14 carbon atoms comprise the longest continuous chain thereof, (2) 3–10 parts of an unsaturated nitrile of the group consisting of acrylonitrile and methacrylonitrile, (3) 2–5 parts of an unsaturated monocarboxylic acid of the group consisting of acrylic acid, methacrylic acid, cinnamic acid, atropic acid and crotonic acid, and (4) correspondingly, 60–25 parts by weight of a monovinylidene aromatic hydrocarbon, said quadricomponent interpolymer having been prepared by (1) first partially polymerizing all of the nitrile component with from 1.5–3 times its weight of vinylidene aromatic hydrocarbon component and then (2) adding the remaining components and (3) completing the polymerization reaction.

2. A paint as in claim 1 wherein the oil is linseed oil.

3. A paint as in claim 1 wherein the oil is a heat bodied linseed oil.

4. A paint as in claim 1 wherein the quadricomponent interpolymer consists of 40 parts of 2-ethylhexyl acrylate, 52 parts of styrene, 6 parts of acrylonitrile, and 2 parts of methacrylic acid.

5. A porous exterior surface protectively coated with (a) an undercoat comprising a pigmented quadricomponent interpolymer containing an oil and (b) a top coat comprising a pigmented quadricomponent interpolymer, the quadricomponent interpolymer containing about (1) 35–60 parts of an unsaturated ester of the group consisting of straight-chain and branched-chain saturated aliphatic alcohol esters of acrylic and methacrylic acid containing total of about 5–20 carbons in the alcohol radical of which about 5–14 carbon atoms comprise the longest continuous chain thereof, (2) 3–10 parts of an unsaturated nitrile of the group consisting of acrylonitrile and methacrylonitrile, (3) 2–5 parts of an unsaturated monocarboxylic acid of the group consisting of acrylic acid, methacrylic acid, cinnamic acid, atropic acid and crotonic acid, and (4) correspondingly, 60–25 parts by weight of a monovinylidene aromatic hydrocarbon, said quadricomponent interpolymer having been prepared by (1) first partially polymerizing all of the nitrile component with from 1.5–3 times its weight of vinylidene aromatic hydrocarbon component and then (2) adding the remaining components and (3) completing the polymerization reaction, said undercoat containing per 100 parts of interpolymer from 20 to 200 parts of oil selected from the group consisting of drying oils, semi-drying oils, and mixtures thereof, said oils containing a catalytic amount of a drier.

References Cited in the file of this patent

UNITED STATES PATENTS

| | | |
|---|---|---|
| 2,606,164 | Henson et al. | Aug. 5, 1952 |
| 2,637,705 | Auer | May 5, 1953 |
| 2,767,153 | Sutton | Oct. 16, 1956 |
| 2,773,849 | Willis | Dec. 11, 1956 |